United States Patent
Zymeri et al.

(10) Patent No.: US 10,248,405 B2
(45) Date of Patent: Apr. 2, 2019

(54) METHOD AND DEVICE FOR THE ROBUST UPDATING OF FIRMWARE OF A VEHICLE VIA AN AIR INTERFACE

(71) Applicant: Robert Bosch GmbH, Stuttgart (DE)

(72) Inventors: Gafur Zymeri, Ronnenberg (DE); Klaus Schneider, Ludwigsburg (DE); Volker Blaschke, Bietigheim-Bissingen (DE); Wolfgang Fischer, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 103 days.

(21) Appl. No.: 15/337,002

(22) Filed: Oct. 28, 2016

(65) Prior Publication Data

US 2017/0123784 A1 May 4, 2017

(30) Foreign Application Priority Data

Oct. 30, 2015 (DE) .......................... 10 2015 221 330

(51) Int. Cl.
| | | |
|---|---|---|
| *G06F 9/44* | (2018.01) | |
| *G06F 8/65* | (2018.01) | |
| *H04L 29/06* | (2006.01) | |
| *H04L 12/24* | (2006.01) | |
| *G06F 8/654* | (2018.01) | |
| *H04L 29/08* | (2006.01) | |

(52) U.S. Cl.
CPC .............. *G06F 8/65* (2013.01); *G06F 8/654* (2018.02); *H04L 41/082* (2013.01); *H04L 67/42* (2013.01); *H04L 41/0863* (2013.01); *H04L 67/025* (2013.01); *H04L 67/06* (2013.01); *H04L 67/12* (2013.01); *H04L 67/34* (2013.01)

(58) Field of Classification Search
CPC ......................................................... G06F 8/65
See application file for complete search history.

(56) References Cited

U.S. PATENT DOCUMENTS

| | | | | |
|---|---|---|---|---|
| 2004/0093597 | A1* | 5/2004 | Rao ........................... | G06F 8/65 717/171 |
| 2004/0243996 | A1* | 12/2004 | Sheehy ..................... | G06F 8/61 717/174 |
| 2014/0068590 | A1* | 3/2014 | Natsume ................... | G06F 8/65 717/170 |
| 2016/0170775 | A1* | 6/2016 | Rockwell ................. | G06F 8/65 713/100 |
| 2017/0315798 | A1* | 11/2017 | Shivanna ................ | G06F 8/654 |

FOREIGN PATENT DOCUMENTS

DE        10105454 A1    8/2002

* cited by examiner

*Primary Examiner* — Hang Pan
(74) *Attorney, Agent, or Firm* — Norton Rose Fulbright US LLP; Gerard Messina (57) ABSTRACT

A method for updating firmware of a vehicle via an air interface, in which data are exchanged with a backend via the air interface through a connection module, the data are managed by a data management module inside the vehicle, the connection module and the data management module are coordinated by a coordination layer, the connection module and the coordination layer are monitored by a monitoring layer, and the data are requested as needed by the coordination layer for an installation.

8 Claims, 4 Drawing Sheets

METHOD AND DEVICE FOR THE ROBUST UPDATING OF FIRMWARE OF A VEHICLE VIA AN AIR INTERFACE

CROSS REFERENCE

The present application claims the benefit under 35 U.S.C. § 119 of German Patent Application No. DE 102015221330.7 filed on Oct. 30, 2015, which is expressly incorporated herein by reference in its entirety.

FIELD

The present invention relates to a method for the robust updating of firmware of a vehicle via an air interface. The present invention additionally relates to a corresponding device, a corresponding computer program, and a corresponding storage medium.

BACKGROUND INFORMATION

In radio technology, the transmission of data via electromagnetic waves, i.e., apparently through the medium of air (over the air, or OTA), is also referred to as the air interface. Such an air interface is in particular distinguished in that no solid-body transmission medium, such as copper cable or glass fiber cable, is used, which for the purposes of the following statements does not exclude transmission in a vacuum. Telecommunications approaches that make use of such a transmission are known as, for example, over-the-air programming (OTA), over-the-air service provisioning (OTASP), over-the-air provisioning (OTAP), or over-the-air parameter administration (OTAPA).

The named technologies are of particular importance for the updating of so-called firmware, i.e., software embedded in electronic devices. Modifications adapted to firmware of the above-named OTA technologies are referred to collectively in telecommunications under the general concept of "firmware over-the-air programming" (FOTA).

German Patent Application No. DE 10105454 A1 describes a method for the automatic updating of software via an air interface that is used to update software running on a system with new software modules, these software modules first being tested and application modules then being derived from these software modules.

SUMMARY

The present invention provides a method for the robust updating of firmware of a vehicle via an air interface, a corresponding device, a corresponding computer program, and a corresponding storage medium.

An advantage of an example embodiment of the present invention lies in the increasing of the robustness of an over-the-air update of software (FW) and in particular firmware (FW), so that problems are avoided in practical use for the original equipment manufacturer (OEM) and end customers. Here it is important to understand that an OTA scenario should function with a high degree of robustness without the support of a workshop. The vehicle, which as a rule is in itself intact, here receives an FW or otherwise SW update in order to expand the functional scope or to remove errors, and thus must not become defective—i.e. incapable of being driven—after an OTA update. This fundamentally distinguishes the OTA scenario from the conventional workshop scenario. Robust solutions according to a specific embodiment of the present invention meet correspondingly high customer expectations.

According to IEEE, ISO/IEC, robustness describes the degree of a system or of a component to correctly ensure functionalities even when the system and the system environment, above all at the system boundaries, are subject to stressful influences and conditions, or unknown input values occur.

The present invention relates not only to individual SW or hardware components, but is composed of a series of functions and above all their appropriate interplay, and the relevant architecture elements.

The following statements describe how, analogous to the classical SW and in particular FW update in a workshop, for example activities of workshop personnel, which ensure robustness in the carrying out of the update in the workshop, take place in automated fashion in the vehicle. Options for further increasing the robustness are also characterized.

One aspect of the present invention relates to the robust FOTA update for the sub-activities in the following overall chain: interaction between vehicle client and backend, download into the vehicle, storage and management, distribution and updating, and disaster handling. The integration of vehicle update data, backend preparation, and rollback and recovery, as further process steps, are conventional.

A further aspect of the present invention is a technical system made up of one or more backend systems and a vehicle subsystem.

An example system of the present invention is therefore made up of a vehicle subsystem for OTA SW and in particular FW updating in an individual vehicle, a backend subsystem for the updating of a fleet or group of vehicles, and the interaction of these components.

BRIEF DESCRIPTION OF EXAMPLE EMBODIMENTS

Exemplary embodiments of the present invention are shown in the figures and are explained in more detail below.

DETAILED DESCRIPTION OF EXAMPLE EMBODIMENTS

Figure 1:
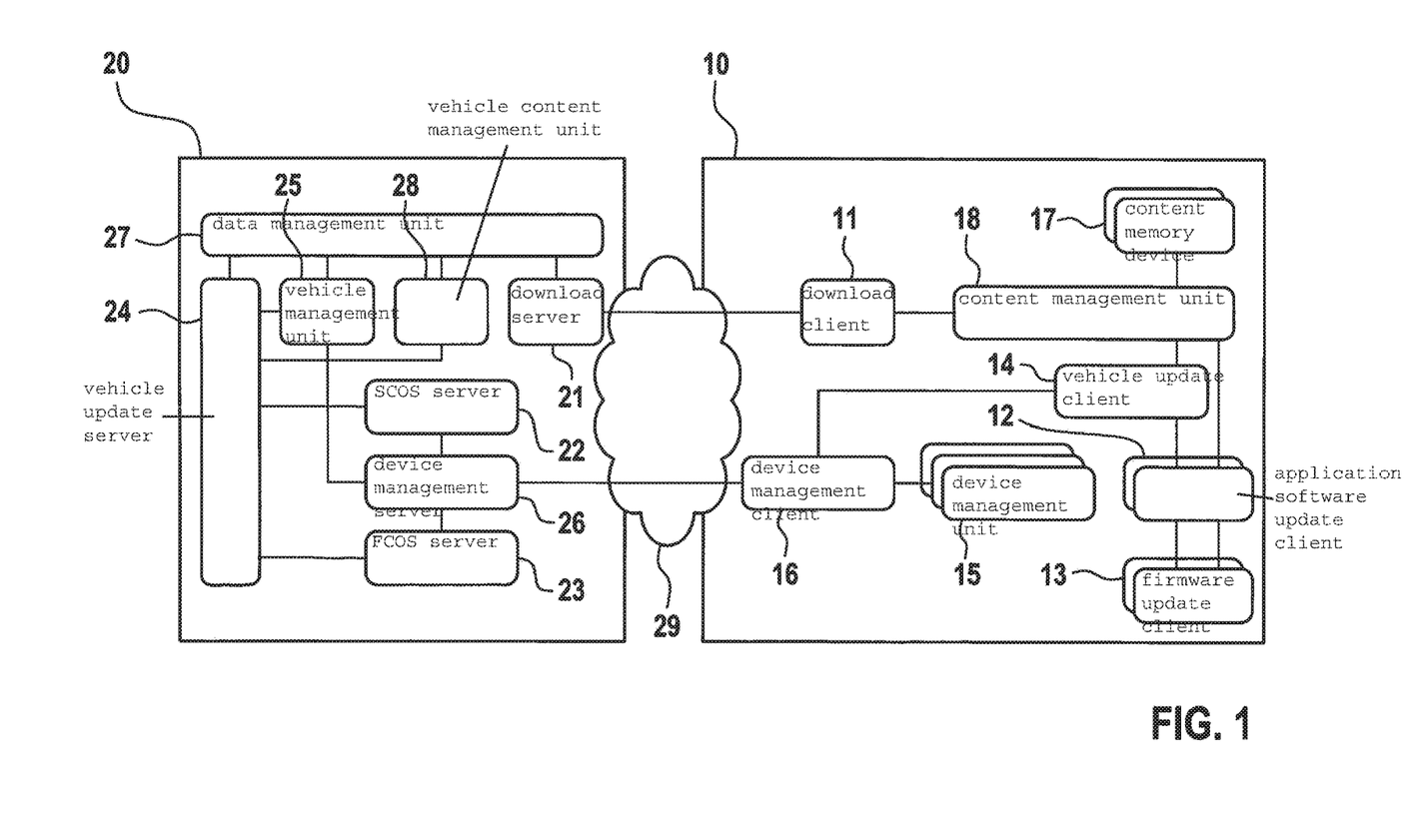
FIG. 1 shows the architecture forming the basis of a specific embodiment of the present invention.

The system is based on the technical architecture illustrated in FIG. 1, which increases not only modularity, expandability, and adaptability, but also robustness. For this purpose, the data download is separated in a component implemented both as download server 21 in backend 20 and as download client 11 in vehicle 10. The device management is separated in a component implemented both as device management server 26 in backend 20 and as device management client 16 in vehicle 10. A proxy at the vehicle is used to bundle distributed implementations of the device management—for example in a plurality of domains—to form a single implementation.

The software update and management is separated in a component implemented both as SCOS server 22 and FCOS server 23 in backend 20 and also as application software update client 12 and firmware update client 13 in vehicle 10. Here, SCOMO/FUMO designates the functionality corresponding to OMA-DM as an example of an implementation.

A vehicle management unit 25 is used to specify a "device" at vehicle 10, including its relevant topology, i.e., control devices (electronic control units, ECUs) and subsystems.

The technical data handling on the part of backend 20 is separated in a vehicle content management unit 28 that links the various versions and variants of data states to vehicle 10. Also separated is the update logic unit including campaign management, implemented both as vehicle update server 24 in backend 20 and as vehicle update client 14 in vehicle 10.

The data management in vehicle 10 is separated as content management 18. The same holds correspondingly for the firmware update component, separated for the ECU updating in vehicle 10, which can be present in a plurality of variants and instances—such as that of an application software update client 12 or a firmware update client 13—and is capable of updating the various units and technologies.

The contents and functions of the stated components are now explained in detail.

Vehicle management unit 25 is responsible for the knowledge of vehicles 10—in the sense of a set or group of vehicles 10—of vehicle 10 itself and its vehicle topology for all purposes, and is capable of mapping a device onto vehicle 10 supplied by device management unit 15, 16, 26. For this purpose, device management unit 15, 16, 26 identifies and communicates with a device, not necessarily a vehicle 10 or a known vehicle 10. Here, a plurality of devices can be combined to form a vehicle 10. Equally, device management unit 15, 16, 26 can identify a different device type, for example a lawnmower. Device management unit 15, 16, 26 thus identifies the device type in order to enable forwarding to its management function. In the present example, this is vehicle management unit 25.

Device management server 26 is capable of carrying out all management actions with the associated device. For this purpose, a protocol is necessary in order to convey such management objects to and from the device.

Device management unit 15, 16, 26 is able to handle a plurality of devices of various types. Known devices are identified and typed using data management unit 27 in order to become a "known device." A known device is conducted to the associated management function—in the present case, vehicle management unit 25. For the purposes of the following statements, it is assumed that all devices are typed as "road vehicles" and processed by vehicle management unit 25. Nonetheless, the device management unit is preferably also capable of supporting other types and cases of application.

Device management client 16 makes it possible to introduce software component management in the associated runtime environment from a device management server 26. The device management driver supports device recognition and parameter configuration by device management client 16. Device management client 16 in turn interacts with one or more device management agents 15 in the environment, which are responsible, via an optional device management proxy, for carrying out the management activities using a supplied software component management object. Device management client 16 uses the general warning mechanism to communicate the final notification including the status of the management activity.

If a plurality of instances of device management client 16 exist, then this activity is executed, as the best possible alternative, by a single instance of device management client 16 and additional device management agents 15. In order to make it possible, given a single device per vehicle 10, equally to support a plurality of device management clients 16, a device management proxy is used. Thus, on each IP-capable system 46 an instance of the device management agent 15 runs, and uses the central proxy of device management client 16.

The device management proxy component makes it possible to avoid a plurality of instances of device management client 16. For this purpose, each device management agent conducts and aggregates the device management object to device management client 16. The device management agent can run in various runtime environments. The proxy is responsible, and ensures the unambiguous allocation between vehicle 10 and device.

Vehicle content management unit 28 is responsible, at backend 20, for mapping the content, compressing it for transmission if necessary, and packeting it for use regarding software updates. The management unit receives the data and content from data management unit 27, and this unit stores the data and content in a uniform manner. Thus, the OEM variance with regard to data and content within vehicle 10 is completely covered by data management unit 27. This also includes the unambiguous semantic and syntactic relationship between the output of data management unit 27 and the associated content management unit 18 at vehicle 10.

SCOS server 22 is responsible for the construction and transmission of the management objects for application software updates. In the case of a use of OMA-DM, this can be realized through the use of the SCOMO protocol and management objects. SW update client 12 is responsible for the execution of SCOS instructions. It uses the software component supplied to the device, and guarantees that warnings communicating a successful or failed result are conducted back to SCOS server 22. In order, given a single device per vehicle 10, to be able equally to support a plurality of SW update clients, a plurality of variants and instances are used. Here, all SW update client instances are orchestrated by the vehicle update server 14. Thus, an instance of SW update client 12 can run on each IP-capable system.

Download server 21 is responsible for providing the update packets that are to be transmitted later. Download server 21 obtains its content from vehicle data management unit 27, coordinated by vehicle update server 24. This server ensures that only those update packets actually used and needed by vehicle 10 are available through download server 21.

The value creation chain "vehicle update request, content assembly, content provision" through download server 21 is thus carried out only for active vehicles 10 within a defined campaign.

Download client 11 is responsible for the downloading of software components, firmware, or other content to vehicle 10. Download client 11 can support DLOTA or some other air interface 29, for example based on HTTP, HTTPS, or FTP. Download client 11 preferably has an interface to a content memory device 17 via content management unit 18.

Vehicle update server 24 is responsible for the coordination layer of the vehicle update process. In other words, it carries out the defined update campaign or the defined update campaigns. The specification of the campaign, originally prescribed by the OEM data and service management, for a particular vehicle 10 can be obtained by data management unit 27. This specification combines the required services and processes to form a resulting update process. If vehicle 10 has been recognized and noted by vehicle management unit 25, its state and status are permanently monitored by data management unit 27.

Vehicle update client 14 is responsible for executing the requests of vehicle update server 24. Vehicle update client 14 thus coordinates the vehicle update process, or an arbitrary part thereof, including application software updates, for vehicle 10. In order to enable flexibility and simple linking to existing technologies, vehicle update client 14 also implements a management interface to the device management. In addition, vehicle update client 14 takes over the responsibility for the downloaded content, receives the part relating to vehicle 10, such as the update process data and other auxiliary information, and delegates the updating and content to client 12 or 13.

If for example OMA-DM is used, then FUMO and/or SCOMO objects can be used.

Data management unit 27, at backend 20, is responsible for supplying consistent data and content to the services.

Content management unit 18 is responsible for persistently storing all kinds of content within vehicle 10. It acts as a network-attached storage unit (NAS) of vehicle 10, including the capability of loading the data from a Web source. Multiple instances of a content storage unit 17 can exist within vehicle 10, and are managed by content management unit 18. Content management unit 18 takes care of storage, depacketing, and combining of data, and can be used for every kind of application within vehicle 10.

Content storage unit 17 is responsible for persistently storing all kinds of content within the control device (electronic control unit, ECU). It is used in the manner of a character-oriented device data file (raw device). Multiple instances of content storage unit 17 can exist within vehicle 10 and are managed by content management unit 18. Content storage unit 17 takes care of storage and can be used for every kind of application within vehicle 10.

Control device update client 12 or, respectively, 13 is responsible for the execution of the application software or firmware updates for a particular control device or a particular subregion. Control device update client 12 or, respectively, 13 acts as client and is connected to vehicle update client 14. It manages the application software or firmware update process, including the rollback for a particular control device or a particular subregion. In addition, it is responsible for ensuring that the state of the control device or subregion is known at all times.

Through the division of the overall functionality (of the vehicle subsystem) into self-contained and decoupled components, influencing factors that would result in a changed behavior of the overall functionality are reduced to the sub-functionalities. For this purpose, architecture and design patterns known as such are used, such as for example redundancy freedom (coherent systems having defined and separated task areas reduce redundancy), as well as loose coupling, which overall limit, reduce, or make recognizable the influence of unknown input values or stressful influences and conditions on the relevant interfaces.

The technical system based on the design presented here and the architecture presented here enables above all the handling of invalid or unknown input values or stressful influencing factors and conditions in such a way that such influencing factors have an effect only on the behavior of the relevant components (locality), and that this changed behavior is recognizable at the interfaces to higher-order, monitoring, and controlling components (transparency). This enables a gradated and integrated reaction of the system.

The interplay of the functions in this solution system relates to the interaction when SW or hardware components or functions are omitted, or do not report results to higher-order components within defined sequences, etc. Conversely, for example the omission of higher-order instances has no, or little, effect on concrete and specialized components relating to an SW and in particular FW update.

The decoupled robustness is described in detail in the following points:

In a first step, the robustness of the system is increased in that the robustness of the overall behavior of the system during the OTA SW and in particular FW update is not influenced by stressful and, possibly, abnormal system environmental conditions; rather, effects of a sub-behavior are already recognized and intercepted by the decoupled components.

In a second step, the decoupling of the overall functionality and the access to the sub-functionalities provided by the components via the loose coupling of other components and functions brings about a dependency and responsibility relation required via the loose coupling.

That is, the OTA SW and in particular FW update overall functionality is decoupled, and brings it about that sub-functionalities are delegated by higher-order components to lower-order decoupled components for execution, and have to be provided to the higher-order components by the lower-order components.

In a third detailing step of the system proposed here, there take place the progress report (determined via loose coupling) and the obtaining of an agreement of the higher-order component and function. This is advantageous when particular conditions occur. Consider the following example: a delegated action has to be executed repeatedly, because errors have occurred during the execution.

Figure 2:
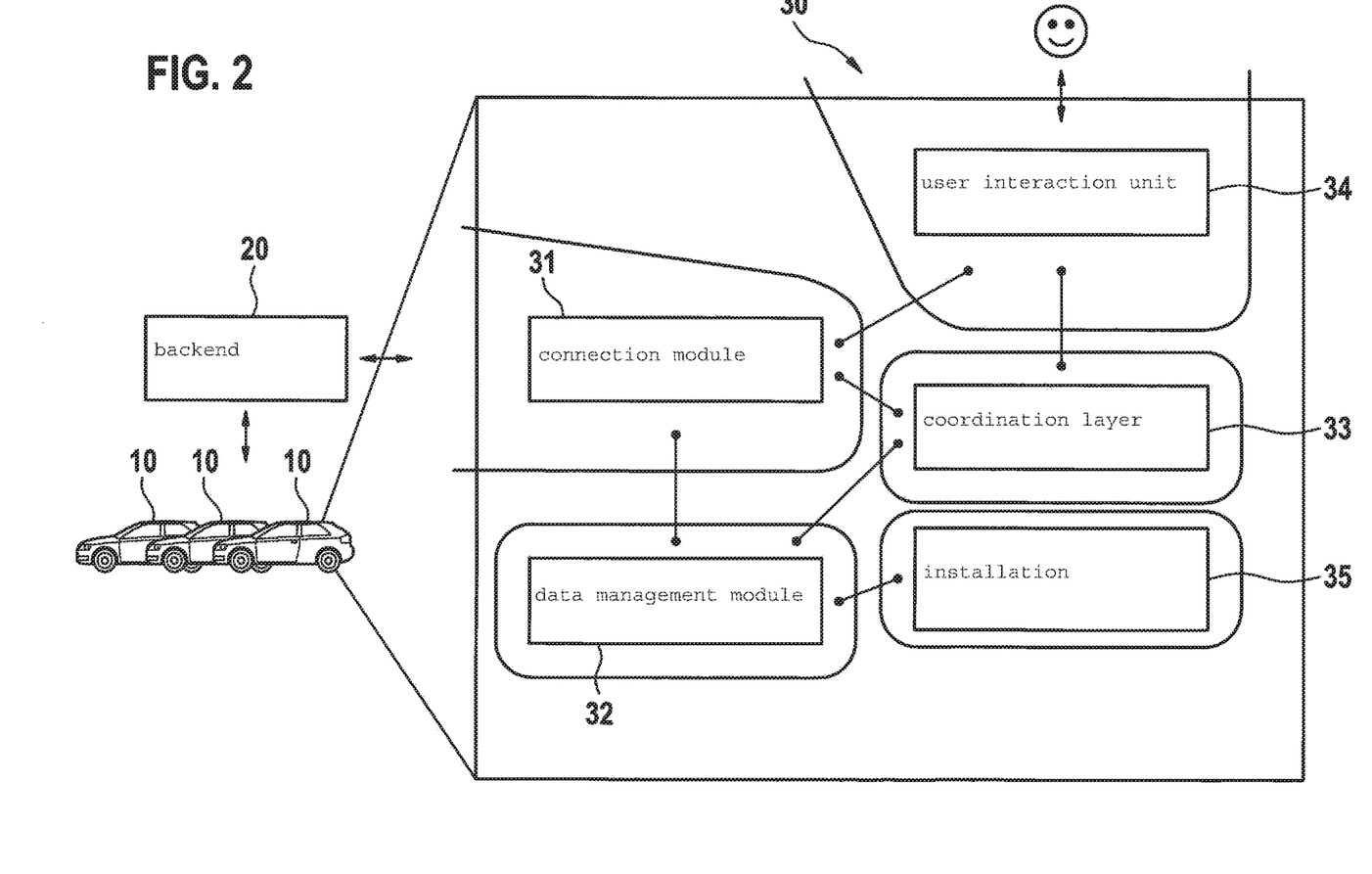
FIG. 2 shows the assignment of the functional components in autonomous regions, with interaction dependencies and responsibilities.

Based on its specialization (for example robust download or error-free storing of the data), each of the following components carries out the assigned actions in uninterrupted fashion as long as these are not otherwise controlled (interrupted, paused, continued) by higher-order components and functions, as shown in FIG. 2: a connection module 31 that interacts with a backend 20 via the air interface 29, a robust data management module 32 within vehicle 10 that interacts with connection module 31, a coordination layer 33 that interacts with connection module 31 and data management module 32, a user interaction unit 34 that interacts with connection module 31 and coordination layer 33, and an installation 35 that interacts with data management module 32 and coordination layer 33.

Connection module 31 here includes an autonomous interaction with backend 20 and a recognition and evaluation of the last known vehicle states, as well as an autonomous execution of a requested download or upload and a robust handling of a connection via air interface 29. Data management module 32 includes an autonomous storage and granting of access, as well as a reserving and releasing of storage space as a function of coordination layer 33. Installation 35 takes place with a permission granted by coordination layer 33, as well as with a controlling authority limited to a target object, and includes a controlling, checking, decision, execution, and monitoring of installation 36.

The direction in which a reporting handover takes place is controlled on the one hand by vehicle update client 14, when it relates to further lower-order components, such as software update clients 12, 13, and on the other hand is also controlled by the components themselves, for example connection module 31, using download client 11 or device management client 16 or user interaction unit 34. This is because if, due to a critical weak point (single point of failure), vehicle update client 14 fails and involved components such as user interaction unit 34 or connection module 31 seek an interaction with a vehicle update client 14 but cannot reach it due to the failure, then these are at least automatically capable of using their own component functionality and to carry out the reporting and interaction, and to use the last known step for further actions. In the example of connection management 31, a device management client 16 at backend 20 would report about for example the failure of a vehicle update client 14, with incorporation of the last known steps and information. In the case of user interaction 34, the user would be informed that there are internal errors and that vehicle update client 14 cannot be reached (autonomy).

In the following, the robustness, also shown in FIG. 2 and already explained, of the FOTA overall system is shown based on the decoupled robustness, locality, transparency, and autonomy, by describing, for each of the functional components, the interplay with other decoupled functional components.

The robust coordination layer 33, using vehicle update client 14, handles problems at the ECU level up to the vehicle level, and, as a further option, the disaster level (to be resolved in backend 20).

For each update that is to be executed separately, the orchestration component is capable of unmistakably unambiguously identifying and administering all corresponding data and actions, and enabling access thereto, by managing and administering the existence to the data or actions, and providing the reference (or the data themselves) to data management module 32, connection module 31, or update client components—similar to the way workshop personnel would do this manually.

The orchestration unit uses the functionalities of data holding management unit 32 and connection management unit 31 by providing the necessary information so that the download of update data can be carried out decoupled from coordination layer 33, and the downloaded data can be stored at a warranted storage location, and that sufficient storage space is present for the relevant and pending download, so that these data, stored in vehicle 10, can be used at any later time by other authorized components, as long as the orchestration unit enables and manages the existence of the data.

Figure 3:
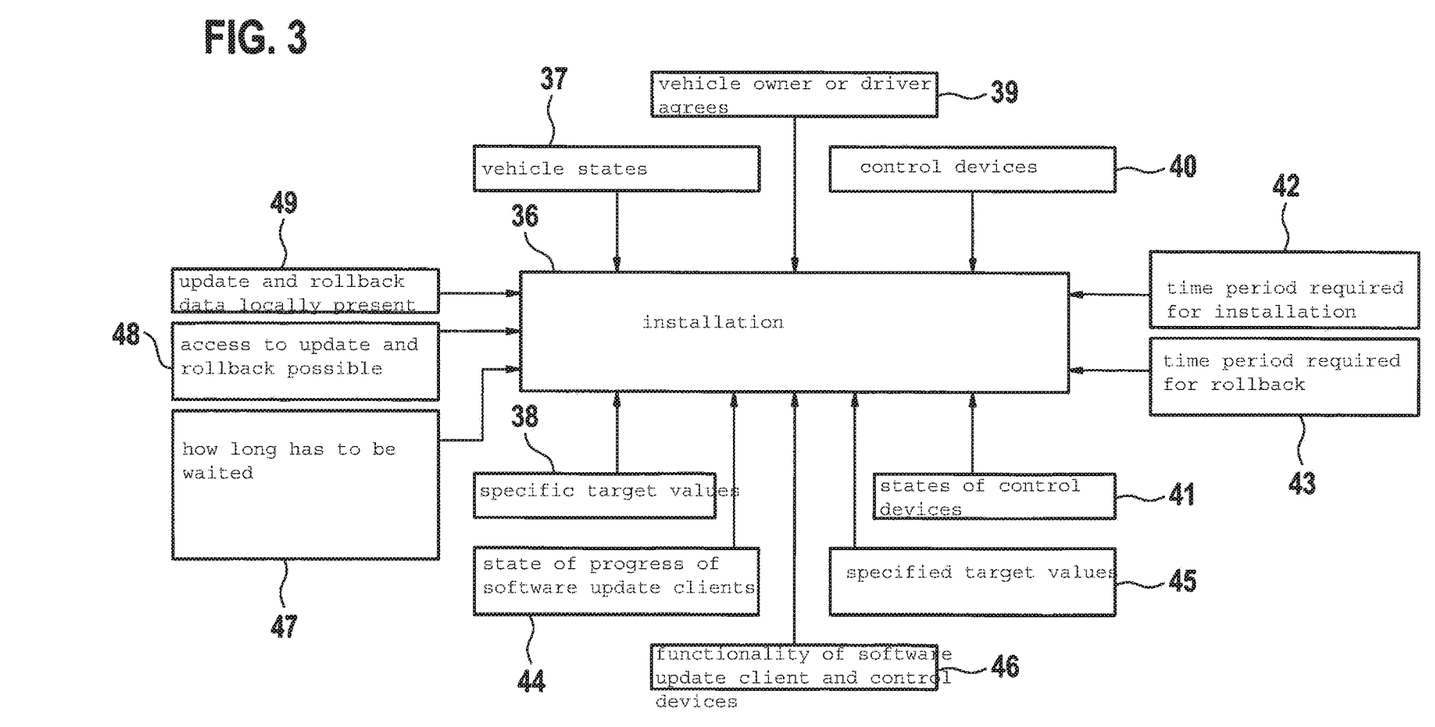
FIG. 3 shows examples of conditions that increase the robustness when taken into account.

Coordination layer 33 ensures all the necessary input quantities that allow coordination layer 33 to, at any time, begin an update at all, to continue it, or, if input quantities and target values defined for the update that are available to coordination layer 33 do not agree with the real states of ECUs, clients, vehicle 10, or user interaction unit 34, to stop the update, or even, if coordination layer 33 receives, parallel to a running update installation, a feedback report from backend 20 concerning connection module 31, to for example not carry out the already assigned update and to discard it (FIG. 3). If the necessary vehicle environmental conditions exist and permit it to coordination layer 33, then the ensuring of all necessary input quantities also includes actively activating or deactivating a vehicle function, and thus for example actuating an electronic hand brake, if this has been defined as a target value that has to exist so that an update can be carried out. In addition, coordination layer 33 is able to reset all executed active actions to the original state in order to achieve a particular vehicle state "favorable for the update process," and thus for example to again deactivate the electronic hand brake if the update was carried out.

For example, with reference to FIG. 3, coordination layer 33 can be a function of at least one of the following circumstances: vehicle states 50 can be queried (37) and correspond to specified target values (38); a vehicle owner or driver of the vehicle 10 agrees to installation 36 (39); states 51 of the control devices can be queried (40) and correspond to specified target values (41); a time period required for installation 36 is known overall and for the relevant control devices (42); a time period required for rollback 36 is known overall and for the relevant control devices (43); a state of progress of software update clients 12, 13 can be queried (44) and corresponds to specified target values (45); a functionality of software update client 12, 13 and control devices can be used (46); a sequence logic or configuration indicates how long has to be waited for an item of information that cannot be accessed (47); an access to update and rollback data by all relevant components is possible (48); or update and rollback data are locally present (49).

Figure 4:
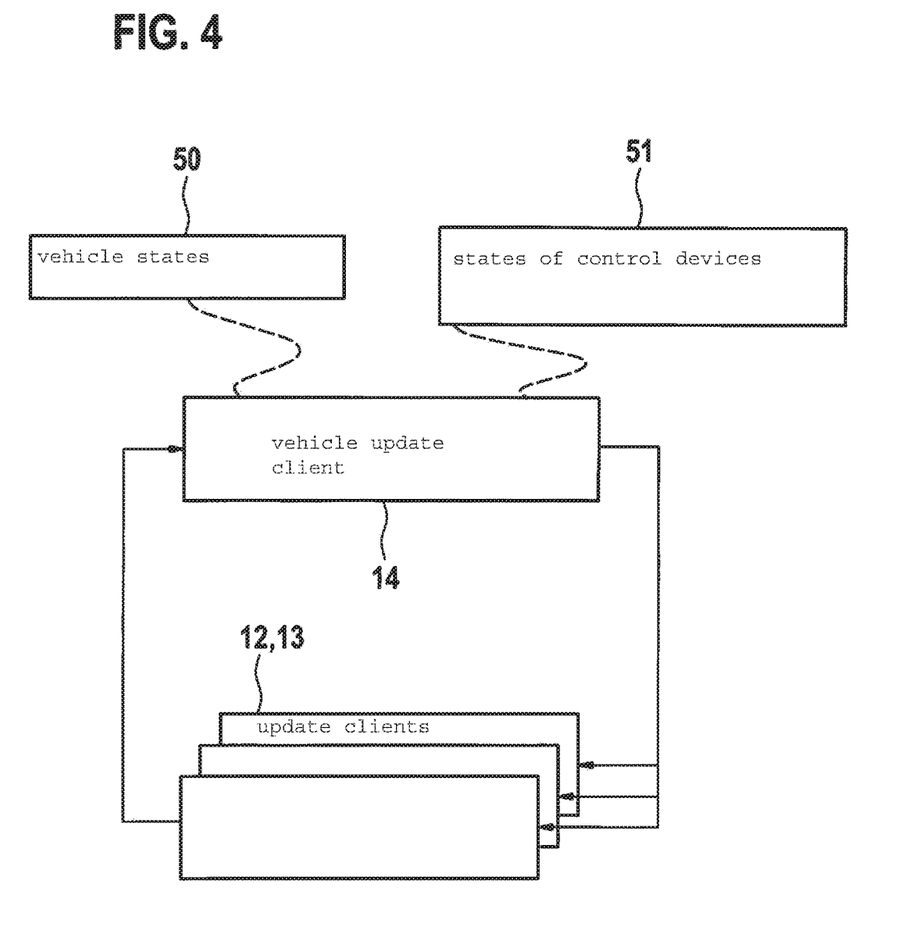
FIG. 4 shows a coordination layer according to the present invention and the transparent handling of the installation execution functions.

All software update clients 12, 13 are capable of carrying out the actual update (installation 36) of an ECU specifically for this unit. Software update clients 12, 13, like the other clients subordinate to the vehicle update clients 14, for example download client 11, are capable specifically of executing functions in a self-contained and specialized fashion (FIG. 4). Moreover, software update clients 12, 13 are capable of determining errors in their functioning and introducing countermeasures. Therefore, they interact with vehicle update client 14—for example in order to obtain authorizations when a rollback 36 has to be executed and it has an effect on functionality at the vehicle level, or in order to communicate reporting information to backend 20 or via a user interaction 34—so that vehicle update client 14, which knows vehicle state 50 and can control it, can finally control the overall update, can ensure a defined state 51 of vehicle 10 taking into account the availability of the drivability of vehicle 10, or, in the case of conditions that cannot be maintained with regard to the overall system, or even in the case of problems that cannot be solved (for example, after the update an ECU simply no longer reacts and vehicle update client 14 recognizes this, so that a vehicle driving function is impaired), can carry out the handover to a user. In the case in which a software update client 12, 13 does not react, vehicle update client 14 is capable of introducing countermeasures.

For each relevant update step, vehicle update client 14 sends reporting information to backend 20, by collecting the information from lower-order components and functions and handing these to connection module 31, which is designed to independently send such data to backend 20 via an existing communication path.

Depending on the situation, vehicle update client 14 decides when, and via which interaction path—such as user interaction 34 via a human-machine interface (HMI) or some other connection—a handover to an end user takes place.

The robust data management module 32 (content management 18) is controlled by coordination layer 33, and obtains information concerning the storage space to be made available for a pending download, or for example for a backup of data. Because coordination layer 33 is the higher-order component and function, it is ensured that a storage space that for example is to be reserved for a pending download is ensured until the orchestration function again releases this storage space, for example after the successful update installation, after a rollback 36, or after an update has been completely discarded.

Data management module 32 reports to coordination layer 33 (as well as other components such as connection module 31) continuously, for example when there are errors, or if a download of a planned size is completely present and has completely been stored by data management module 32, so that coordination layer 33 can carry out further update and installation steps and can check conditions (see FIG. 3). Alternatively, connection module 31, instead of data holding management unit 32, can also continuously report directly to coordination layer 33 concerning errors relating to a download.

Using download client 11 and device management client 16, robust connection module 31 loads unambiguously identifiable data from backend 20 into vehicle 10 concerning known interfaces and communication possibilities. It is capable of storing data in vehicle 10 completely and without error via a robust path, in that it can check the data set actually already downloaded and securely stored in vehicle 10 through interaction via a loose coupling with data management module 32, and can request the exact missing data set from backend 20, and can continue the download from the byte at which it previously stopped and that was the last byte actually securely stored in vehicle 10, and thus air interface connection interruptions and other feedback reports of backend 20 to the component system boundaries are in this way handled without error and robustly.

The depositing of downloaded data enables data management module 32, which offers the functionality of storing data as they were handed over, completely and secure against falsification, via an unambiguous reference.

Connection module 31 reacts to different inputs—for example if a connection to a backend 20 is suddenly interrupted—or to more specific response information of backend 20. It also reacts for example thereto, and controls the download and resume process as a function of inputs of data holding management unit 32, if for example the depositing and storing of downloaded data causes errors.

Connection module 31 is capable of forwarding input received by backend 20 to its responsible components. In this case, vehicle update client 14 is the higher-order instance that controls all functionalities regarding vehicle 10 relating to an update, and also makes use of functionalities of lower-order components.

Backend 20 provides connection module 31 of each vehicle 10 with specific update data, and provides the information that can be used by a connection module 31 and a vehicle update client 14 to timely provide the required storage space for a pending update in vehicle 10, and to load a robust download of the relevant unambiguous and unmistakable update data for vehicle 10 into vehicle 10 via air interface 29, so that a more robust, more resource-efficient, and smoother update can take place.

Through connection module 31 of a vehicle 10, the backend subsystem obtains additional reporting information about each defined update step of the vehicle for a relevant campaign, alongside information about called backend interfaces. Based on the information available to backend 20 about interface calls, as well as reporting information from vehicles 10 relating to a campaign, backend 20 carries out actual-target comparisons of these available reporting values with the threshold values defined in the relevant campaign, and if warranted brings about control actions (pause, stop, continue campaign) at the other vehicles 10 for which the relevant update is still pending or is just being carried out. Through the interplay of the backend and vehicle subsystems, robustness is increased, in that from results of each update step of a specified number of vehicles 10, a robust and correct execution of an update is inferred, and errored or false updates are avoided for future vehicles 10.

Based on the analysis of reporting information, those responsible for campaign and updates can even improve an update campaign and roll it out again.

The presented interplay of functions—at the subsystem level (such as interaction of backend and vehicle subsystems) and at the vehicle level (such as interaction of components and functions)—represents how the traditional steps of a person working in a workshop can be carried out in automated fashion by vehicle 10 in the OTA scenario. Coordination layer 33 corresponds principally to the workshop person, who ensures vehicle state 50 for a robust and correct update, for example ensuring that sufficient power supply is present by connecting an external reserve battery to vehicle 10 (vehicle update client 14, which passively and actively monitors actual and target states of the vehicle system environment and for example checks before the update whether the battery state corresponds to the duration of a pending update, and continuously checks this during the update), or, for each relevant control device, by carrying out the overwriting of the flash memory (flashing) individually or using a central workshop diagnostic tester, to which however the correct data are provided (vehicle update client 14, which delegates and interacts the actual update installation 36 to relevant software update clients 12, 13), and, after each flash or installation step at an individual ECU, checking whether the overwriting and the installation 36 have taken place without error (vehicle update client 14, which knows and actively influences the actual-target states 51 of the ECUs and software update clients 12, 13 involved in the update before, during, and after the update and after each installation 36).

This overall coordination layer 33 of the vehicle update is, in expanded form, the task of coordination layer 33 or of vehicle update client 14, which has to carry out all the orchestration and management work during driving operation of vehicle 10, and has to decide when vehicle 10 has to be in a particular vehicle state 50 for which sub-actions (and for example must not be permitted to move), by comparing the target values of the relevant control device and reacting actively thereto.

The following use cases present examples of sequences. The use cases contain core actions and core steps that are to be carried out. The core steps correspond to the already-presented functional components (connection module 31, data management module 32, coordination layer 33), or are partly contained in these, and are described separately from the other functional components.

Connection module 31 obtains data from an authenticated backend 20. The data contain FOTA information that are forwarded and provided from connection module 31 to coordination layer 33 as the unit assigned to the FOTA data. In parallel, connection module 31 has buffered reporting data concerning the receipt and concerning a successful further distribution of the FOTA data to the responsible component, and (depending on how connection module 31 is configured to communicate with backend 20) if warranted has communicated these immediately to backend 20.

FOTA update availability information thus reaches not only vehicle 10 (for example because previously an update availability check was triggered via an end user or backend 20), but also the responsible target function component (coordination layer 33 or vehicle update client 14) in vehicle 10. This responsible component interprets the FOTA data and recognizes an available update, what memory space is required for the download of the actual update and rollback data, and to what extent and whether a user interaction 34 has to take place—for example that previously a license agreement has to be obtained from the user, that in general the download itself has to be confirmed by the user via an interaction, or that what is concerned is a "silent update" to be executed in the background without having to involve the user for the update, or because a license agreement is not required at all.

Parallel to each described step, for backend 20 particular reporting information is handed over to connection module 31. Connection module 31 buffers this information in order to send it to backend 20 at a particular suitable time, or if warranted sends it to backend 20 immediately after the handover. Backend 20 is able to interpret this reporting information concerning the execution of the update in a vehicle 10, and is able to use this kind of reporting information in aggregated fashion over many further vehicles 10 in order to control the update campaign, and for example to pause it if the reporting information about particular update steps indicates faulty executions.

Coordination layer 33 uses the FOTA update information, and triggers a check at data management module 32 of the required memory space for availability, and—if availability is present—reserves the memory space in an unambiguously identifiable fashion (unambiguous because after termination, or in arbitrary situations, it has to again release the storage space as it was reserved, because coordination layer 33 checks and controls vehicle state 50 and is responsible for the running of the overall update).

Once coordination layer 33 has obtained all the necessary information that it requires (confirmation of the user through interaction if this was required, or the assurance of data holding management unit 32 about the available memory, etc.), then it again hands over, in parallel, reporting information to connection module 31, but also additionally carries out further update process steps in parallel if these are contained in the FOTA information, and delegates, as next step, the download of the actual update data to connection module 31 by using the download descriptor—a uniform resource locator (URL), access information (credentials), etc.—from the FOTA information, and in addition gives connection module 31 the information as to where and how the downloaded data are to be stored (namely in the reserved storage area).

Connection module 31 carries out the delegated task, and during the download if warranted takes into account larger megabyte or gigabyte data, as well as various influences that can occur via the OTA air interface 29. It acts autonomously and independently, and sees to the robust download process, and reacts immediately to queries regarding the download process with reporting information to its higher-order or involved instances and functional components (coordination layer 33, data management module 32). Here as well, after the delegation of the download task to connection module 31, reporting information for forwarding to backend 20 is handed over in parallel to connection module 31. Connection module 31 communicates the status of the download to coordination layer 33 and user interaction 34, in case, if warranted, the status has to be forwarded to the user via user interaction 34 and this type of interaction with the user is defined in the FOTA information and interpreted by coordination layer 33 and therefore has to be executed in this way.

As soon as the download is terminated and the downloaded data are completely available in securely accessible fashion, this is communicated to coordination layer 33 by connection module 31 and, if warranted, also by data management module 32.

Coordination layer 33 interprets data parts—the so-called update flow logic and associated conditions for the concrete update installations—from the downloaded vehicle 10 update packet, which indicate to what extent a user interaction 34 must further take place, and whether an agreement has to be obtained, for example to execute the update at a time proposed by coordination layer 33, as well as, in addition, based on the subsequent FOTA flow logic data, if for example previously a further license confirmation from the end user (driver) also has to take place before the actual update installation can even begin, or because vehicle 10 for example has to be brought into a particular state 51 and it is necessary to obtain confirmation from the user. This information is, as flow logic, part of the vehicle update data packet downloaded via connection module 31. This update packet can also contain how long for example the overall update lasts, which installation executions (software update clients 12, 13) are involved, which control devices or vehicle domains—e.g. infotainment or body control—are involved, and in which state 51 vehicle 10 has to be, i.e., some of the control devices and software update clients 12, 13 involved in the pending update installation may only be executed if for example the battery state of vehicle 10 has a particular charge level, because the update time at a control device would require this.

Coordination level 33 checks the target values contained in the update flow logic and compares these with actual values of vehicle 10 by using the necessary vehicle interfaces, and thus for example obtains the battery state of vehicle 10 and, if warranted, the momentary degree of battery discharging, and, in the target-actual value comparison, decides whether an installation 36 can be started at all. If an installation 36 was already started and vehicle update client 14 for example suddenly determines in parallel, continuously and parallel to the execution of the individual installation 36, on the basis of the target value to be maintained, that an actual value such as for example the battery state has been fallen below in compared to the defined target value at a defined time, then that update installation is for example paused, interrupted, or newly executed, as a function of whether the battery falls below a target threshold value, which is finally defined in the update flow logic, as is how to proceed in such a case. If such a falling below of the target threshold value of the battery state has effects on vehicle state 50 and possibly also on the vehicle driving functionality and the complete execution is defined as a part of the update installation in the update flow logic, the update installation can be completely terminated or an immediate interruption can be initiated, and for example a rollback 36 can be delegated to software update client 12, 13 for execution, depending on how quickly for example rollback 36 can be executed and whether this is defined in the update flow logic and which additional conditions have to be present. In case of a pausing—depending on what has been defined as a further action in the update flow logic for such a special case—vehicle update client 14 controls the corresponding software update client 12, 13 with interruption commands. Vehicle update client 14 would execute its currently running actions possibly to the end, corresponding to its specific functionality, and would leave the ECU in a state 51 (even if not fully functional) defined by vehicle update client 14, or if warranted would interrupt all running actions and report with status states to vehicle update client 14, so that vehicle update client 14 has knowledge about state 51 of software update client 12, 13 and the control device, and can continue to operate according to its update flow logic rules (taking into account vehicle state 50). Pausing of a software update client 12, 13 means causing it to be put into a defined state 51, in that software update client 12, 13 leaves a defined state 51 relating to an installation step and for example stores all necessary information for the session so that it is able, after the end of a pause, to continue from where it left off, for example if a valid battery level is again present, without thus starting anew with the execution initially delegated by vehicle update client 14. An interruption of a software update client 12, 13 means completely interrupting a previously delegated execution action and making a new beginning, with new input values if warranted.

Coordination layer 33 checks at the beginning which of the involved software update clients 12, 13 for specific and separate update installation are at all specialized for a particular target control device or target domain, and which of these software update clients 12, 13 relate to vehicle state 50 and the vehicle driving functionality, and which individual and specific update installations are a function of other update installations in the sequence execution, in order in this way already to execute the independent individual update installations not relating to vehicle state 50 (parallel to the further processing and determination of the update installation start of the other update installations), after for example a start confirmation has been obtained from the end user. The remaining individual update installations, relating for example to vehicle state 50, may possibly require more time until the optimal time for the actual update installation can occur, because for example more comprehensive states 51 in vehicle 10 are requested and a plurality of target-actual value comparisons and states 51 in vehicle 10 have to be fulfilled (because what is concerned is for example an engine control device), for example if a particular battery state has to be present or the relevant control device is permitted to be updated only when vehicle state 50 is at a standstill, and thus for example a particular requested data rate is available via the relevant bus communication channel so that the update installation time planned in the update flow logic can be maintained. The determination of the optimal time of an update installation, given an effect on vehicle driving functionality, can for example also be delayed in that the end user is informed of the failure of the vehicle functionality for a particular time and must agree, and even then the situation must occur that vehicle 10 is actually at a standstill, and only then can the update installation be carried out at a control device with effect on vehicle driving functionality by the corresponding software update client 12, 13, initiated by vehicle update client 14. A possible special case is the following: a driver drives for a long stretch and parks on the highway. Vehicle update client 14 determines that all conditions are met and vehicle 10 for example is at a standstill, and executes the update installation at the engine control device. An end user gets into vehicle 10 and wishes to drive away, but has to wait for example several minutes because vehicle state 50 artificially brought about by vehicle update client 14 (vehicle 10 must not be started or ready to drive during the update installation) does not permit further travel. An expanded special case would be as just described, with the difference that the update installation fails and for example the engine control device no longer functions even after a rollback 36, and vehicle 10 handles the breakdown and the driver cannot travel further on his long trip. From this it is clear that a confirmation of the end user and determination of the optimal time are very important.

Vehicle update client 14 thus delegates all execution actions, such as for example memory space reservations, download processes, or update installation steps, to software update clients 12, 13, which are responsible for update installations in relevant domains or at relevant control devices, and even ensures the necessary vehicle states 50 and ECU states 51 in that it for example not only delegates execution actions, but also causes the availability of for example software clients 12, 13 and ECU used to be checked ahead of time, checks the battery state and the vehicle mode (whether it is standing still or driving), incorporates user interaction 34 and user reporting, and incorporates the individual feedback values in its target-actual value comparisons. This orchestration work can be carried out by coordination layer 33 or by vehicle update client 14 even while individual already-delegated executions are continuing, and target-actual value comparisons are being carried out in parallel, by demanding status, progress, and availability information from the functional components, and also providing this information (FIG. 3, FIG. 4).

Through its transparent responsibility for providing reporting information for each relevant step to its observer (connection module 31, user interaction 34), it is ensured that even when there is failure of coordination layer 33 the decoupled and autonomous functional components can forward the last known state 51, and for example a failure, for example to backend 20 or directly to the user via user interaction 34.

The update flow logic definition is either data-oriented, and there exists an implementation counterpart in vehicle 10 (here: coordination layer 33, or vehicle update client 14) that interpret the data and for example can understand and implement all occurring attributes, parameters, and values, or the update data flow logic definition contains, for vehicle 10 and its specific end-to-end (E/E) vehicle model and E/E vehicle topology, rules that can be executed specifically in parallel, or update flow logic, in the sense of a script, also executed by coordination layer 33 using an interpreter.

If vehicle update client 14 has determined, through target-actual value comparisons within vehicle 10 after the update—for example checking the current SW and in particular FW versions on the basis of target SW and in particular FW versions—that the vehicle update has run successfully, it is in the position—depending on how it was defined in the update flow logic when the step is to be executed under what conditions after a successful update, for example if the target-actual value comparison of SW and in particular FW versions was successful—to again release the reserved memory space and delete the old update data by interacting with data management module 32.

The robust handling of special cases also includes for example the following:

An update availability abort trigger through backend 20, while an update is already being executed in vehicle 10, makes it possible for vehicle update client 14 to interrupt and undo updates that are running or have already been carried out, by causing rollback actions to be carried out by software update clients 12, 13.

For example if memory space availability is no longer present (for a variety of reasons), vehicle update client 14 receives corresponding status information and can control the update at vehicle 10 based on its update flow logic.

If for example state 51 of the relevant software update clients 12, 13 or ECUs is no longer available, or state 51 of the relevant ECUs and software update clients 12, 13 can no longer be requested by vehicle update client 14, vehicle update client 14 ensures a particular vehicle state 50, and reports to its observer.

Options that, as additional elements, contribute to robustness include a dual architecture in which the FOTA components and functions are distributed.

What is claimed is:

1. A method for updating firmware of a vehicle via an air interface, comprising:
   exchanging data with a backend via the air interface through a connection module;
   managing the data by a data management module inside the vehicle;
   coordinating the connection module and the data management module by a coordination layer, the coordinating including:
      receiving, by the coordination layer from the connection module, an indication of a required memory space for download of an update for the firmware,
      triggering, by the coordination layer, (i) a check at the data management module for availability of the required memory space and (ii) a reservation at the data management module of memory space corresponding to the required memory space,
      providing, by the coordination layer to the connection module, information of how and where the update for the firmware is to be stored in the reserved memory space, and
      delegating, by the coordination layer to the connection module, downloading of the update for the firmware from the backend via the air interface, wherein the connection module carries out the delegated downloading using the information provided to the connection module from the coordination layer and independently from the coordination layer;
   monitoring the connection module and the coordination layer by a monitoring layer; and
   requesting the data as needed by the coordination layer for an installation.

2. The method as recited in claim 1, further comprising:
   initiating, by the connection module, an autonomous interaction with the backend and a noting and evaluation of last known vehicle states; and
   initiating, by the connection module, an autonomous carrying out of an assigned download or upload, and a handling of a connection via the air interface.

3. The method as recited in claim 2, further comprising:
   initiating, by the data management module, an autonomous storing and granting of access; and
   initiating, by the data management module, a reserving and release of storage space that is a function of the coordination layer.

4. The method as recited in claim 3, further comprising:
   using, by the coordination layer, a vehicle update client as a function of vehicle states and states of control devices and corresponding software update clients;
   controlling, by the vehicle update client, the software update clients with starts, pauses, and stops;
   querying, by the vehicle update client, the software update clients;
   providing, by the vehicle update client, information to the software update clients; and
   supplying, by the software update clients, a status and requests to the vehicle update client.

5. The method as recited in claim 4, wherein the coordination layer initiates an installation and, as needed, a rollback as a function of at least one of the following circumstances:
   the vehicle states can be queried and correspond to specified target values;
   a vehicle owner or driver of the vehicle agrees to the installation;
   the states of the control devices can be queried and correspond to specified target values;
   a time required for the installation is known overall and for the relevant control devices;
   a time required for the rollback is known overall and for the relevant control devices;
   a state of progress of the software update clients can be queried and corresponds to specified target values;
   a functionality of the software update clients and control devices can be used;
   a flow logic or configuration indicates how long has to be waited for an item of information that is not accessible;
   an access to update and rollback data of all components involved is possible; or
   update and rollback data are locally present.

6. The method as recited in claim 5, wherein the installation takes place with a control authority limited to a target object, and includes a controlling, checking, decision, execution, and monitoring of the installation; and the installation takes place with a permission granted by the coordination layer.

7. The method as recited in claim 1, wherein the monitoring layer autonomously initiates a monitoring and evaluation of at least one of the following circumstances:
   an availability of coupled instances; and
   a last known state of adjacent instances.

8. A non-transitory machine-readable storage medium on which is stored a computer program for updating firmware of a vehicle via an air interface, the computer program, when executed by a processor, causing the processor to perform:
   exchanging data with a backend via the air interface through a connection module;
   managing the data by a data management module inside the vehicle;
   coordinating the connection module and the data management module by a coordination layer, the coordinating including:
      receiving, by the coordination layer from the connection module, an indication of a required memory space for download of an update for the firmware,
      triggering, by the coordination layer, (i) a check at the data management module for availability of the required memory space and (ii) a reservation at the data management module of memory space corresponding to the required memory space,
      providing, by the coordination layer to the connection module, information of how and where the update for the firmware is to be stored in the reserved memory space, and
   delegating, by the coordination layer to the connection module, downloading of the update for the firmware from the backend via the air interface, wherein the connection module carries out the delegated downloading using the information provided to the connection module from the coordination layer and independently from the coordination layer;
   monitoring the connection module and the coordination layer by a monitoring layer; and requesting the data as needed by the coordination layer for an installation.

\* \* \* \* \*